(12) United States Patent
Naick et al.

(10) Patent No.: US 7,395,317 B2
(45) Date of Patent: Jul. 1, 2008

(54) METHOD AND APPARATUS FOR TRANSFERRING DATA FROM AN APPLICATION TO A DESTINATION

(75) Inventors: Indran Naick, Cedar Park, TX (US); Jeffrey Kenneth Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 10/687,237

(22) Filed: Oct. 16, 2003

(65) Prior Publication Data

US 2005/0086304 A1   Apr. 21, 2005

(51) Int. Cl.
*G06F 13/00* (2006.01)
(52) U.S. Cl. .................. 709/213; 709/202; 719/329
(58) Field of Classification Search ............ 709/202, 709/213, 217; 719/329
See application file for complete search history.

(56) References Cited

U.S. PATENT DOCUMENTS

| 5,801,693 | A | 9/1998 | Bailey ................... 345/339 |
| 2003/0154207 | A1* | 8/2003 | Naito ................... 707/100 |
| 2003/0227489 | A1* | 12/2003 | Arend et al. ............ 345/804 |
| 2004/0257346 | A1* | 12/2004 | Ong et al. .............. 345/179 |
| 2005/0004986 | A1* | 1/2005 | Aoki et al. ............. 709/206 |
| 2005/0240596 | A1* | 10/2005 | Worthen et al. .......... 707/10 |

* cited by examiner

*Primary Examiner*—Veit Vu
(74) *Attorney, Agent, or Firm*—Duke W. Yee; Herman Rodriguez; James O. Skarsten

(57) ABSTRACT

A method, apparatus, and computer instructions for sending content from a first application to a second application. In response to a user input indicating a selection of content for transfer to the second application, the selection of the content is copied to form copied content. The copied content is then automatically sent to the second application without requiring additional user manipulation of the copy content. Additionally, the destination may be another user. In this case, the second application is employed to automatically transfer the copied content to that second user.

10 Claims, 3 Drawing Sheets

METHOD AND APPARATUS FOR TRANSFERRING DATA FROM AN APPLICATION TO A DESTINATION

BACKGROUND OF THE INVENTION

1. Technical Field

The present invention relates generally to an improved data processing system and in particular to a method and apparatus for processing data. Still more particularly, the present invention relates to a method, apparatus, and computer instructions for transferring data from an application to a destination.

2. Description of Related Art

The use of data processing systems is pervasive in the workplace. Users generate documents, spreadsheets, and visual presentations on a daily basis. Further, users communicate with each other through email and instant messages over networks, such as wide-area networks and the Internet. This widespread use of computers and the interconnectivity provided through networks allows for different users to collaborate or work with each other in different locations. Collaborating users may be as close as in an office down the hall or on another floor, or as far away as in another city or country. Regardless of the distance, users are able to communicate with each other and collaborate on different projects.

Often times, a user might find a need for sending a portion of a document to another user for review or use by the remote user. For example, two people may work on a document and one individual may decide that the other should inspect a particular paragraph that is being drafted. In the current process, the user selects and copies the text for the paragraph. Thereafter, the user opens an email client or similar application. The text is then pasted by the user into the application. The user then identifies the recipient and sends the content to him/her for inspection. Such a process is time-consuming and requires many steps. In some cases, this tedious process may result in less collaboration if a user does not feel that the need for another user to review a portion of a document or a spreadsheet is great enough to justify the effort required to send the content to another user for review.

Therefore, it would be advantageous to have an improved method, apparatus, and computer instructions for sending data from one user to another user.

SUMMARY OF THE INVENTION

The present invention provides a method, apparatus, and computer instructions for sending content from a first application to a second application. In response to user input indicating a selection of content for transfer to the second application, the selection of the content is copied to form copied content. The copied content is then automatically sent to the second application without requiring additional user manipulation of the copy content. Additionally, the destination may be another user. In this case, the second application is employed to automatically transfer the copied content to that second user.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
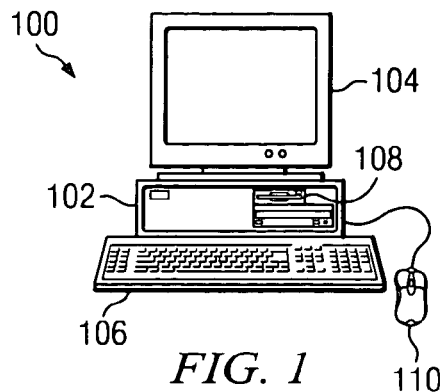
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
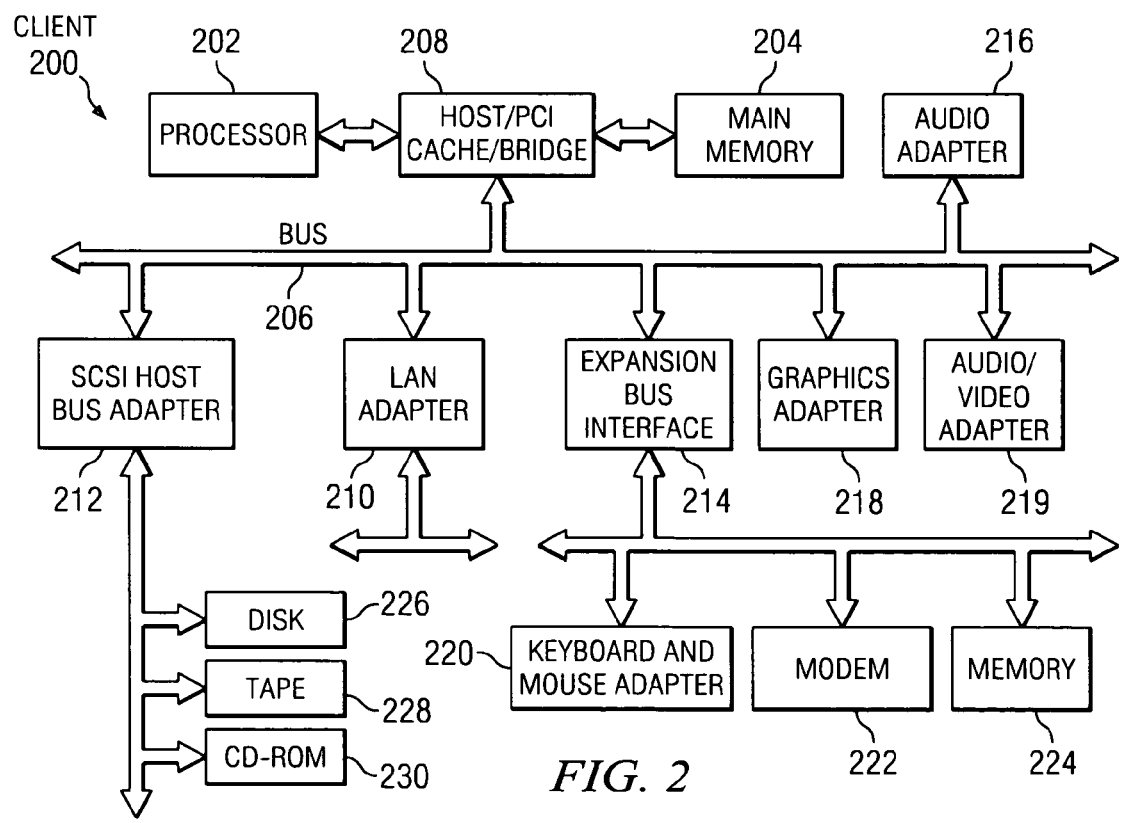
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection.

In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and the above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides an improved method, apparatus, and computer instructions for sending content from one application to another location or application. The mechanism of the present invention facilitates the process of identifying content and placing the content into another process. This other process may be, for example, another application or a complete throughput process, such as saving a file to a file system. Sending the content to another application may include activating an email client, placing the content into an email message, and sending that message to the desired location or destination.

Figure 3:
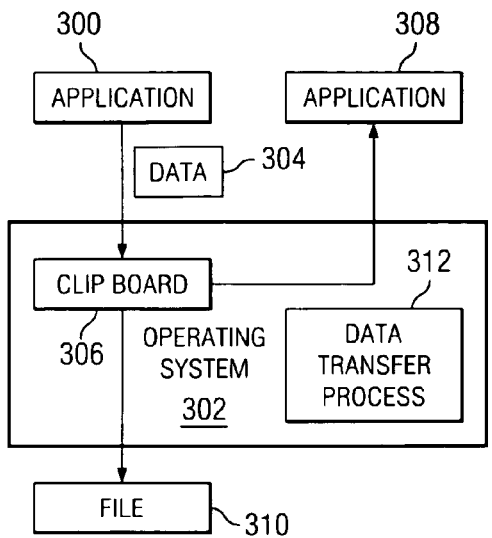
FIG. 3 is a block diagram of components used in transferring data from an application to a destination in accordance with a preferred embodiment of the present invention.

Turning next to FIG. 3, a block diagram of components used in transferring data from an application to a destination is depicted in accordance with a preferred embodiment of the present invention. A user may decide to select content from application 300 for transfer to a destination or target, such as another application or a file. This application may be, for example, a word processor, a spreadsheet program, or a computer aided design drawing program. The user selects some portion of the content from application 300. This selected content is copied from application 300. The selected content may be, for example, an image, text from a document, a spreadsheet, a portion of a spreadsheet, or any content that may be selected and copied.

In the depicted examples, the copy function is provided through operating system 302. The selected content forms data 304, which is stored in a memory or buffer, such as clip board 306 or some other storage mechanism provided through operating system 302 for copy and paste functions. This copy and paste function may be one such as the clip board function described in U.S. Pat. No. 5,801,693.

Thereafter, the user through some selected user input, such as a right click on a mouse or other pointing device may select to send data 304 to another location. This location may be, for example, application 308 or even a file, such as file 310 within the data processing system.

Application 308 may take various forms, such as an email program, another word processing program, or an instant messaging program. In the event that application 308 is to be used as a transport mechanism to send the data to a remote location, the mechanism of the present invention may initiate the execution of application 308. Data 304 is sent to application 308 through an interface in application 308. This interface is typically an existing interface that allows for a transfer of content to the application. Alternatively, a set of scripts may be used to manipulate application 308.

In these examples, the reception of the user input selecting the destination for the data and the initiation of application 308 is handled by data transfer process 312. In these examples, data transfer process 312 is implemented within operating system 302. In other instances, data transfer process 312 may be implemented as an application or even be part of application 300, depending on the particular implementation. If data transfer process 312 is implemented as an application, the various functions within operating system 302 may be accessed through an interface, such as an application programming interface (API). This interface is a language and message format used by an application to communicate with an operating system or some other controls program.

Further, data transfer process 312 may present a user with a list of addresses if application 308 is an email or messaging program. Thereafter, the activation of application 308 and the sending of the content are performed without requiring the user to initiate execution of application 300 and perform the normal steps needed to transmit an email message or a text message.

Figure 4:
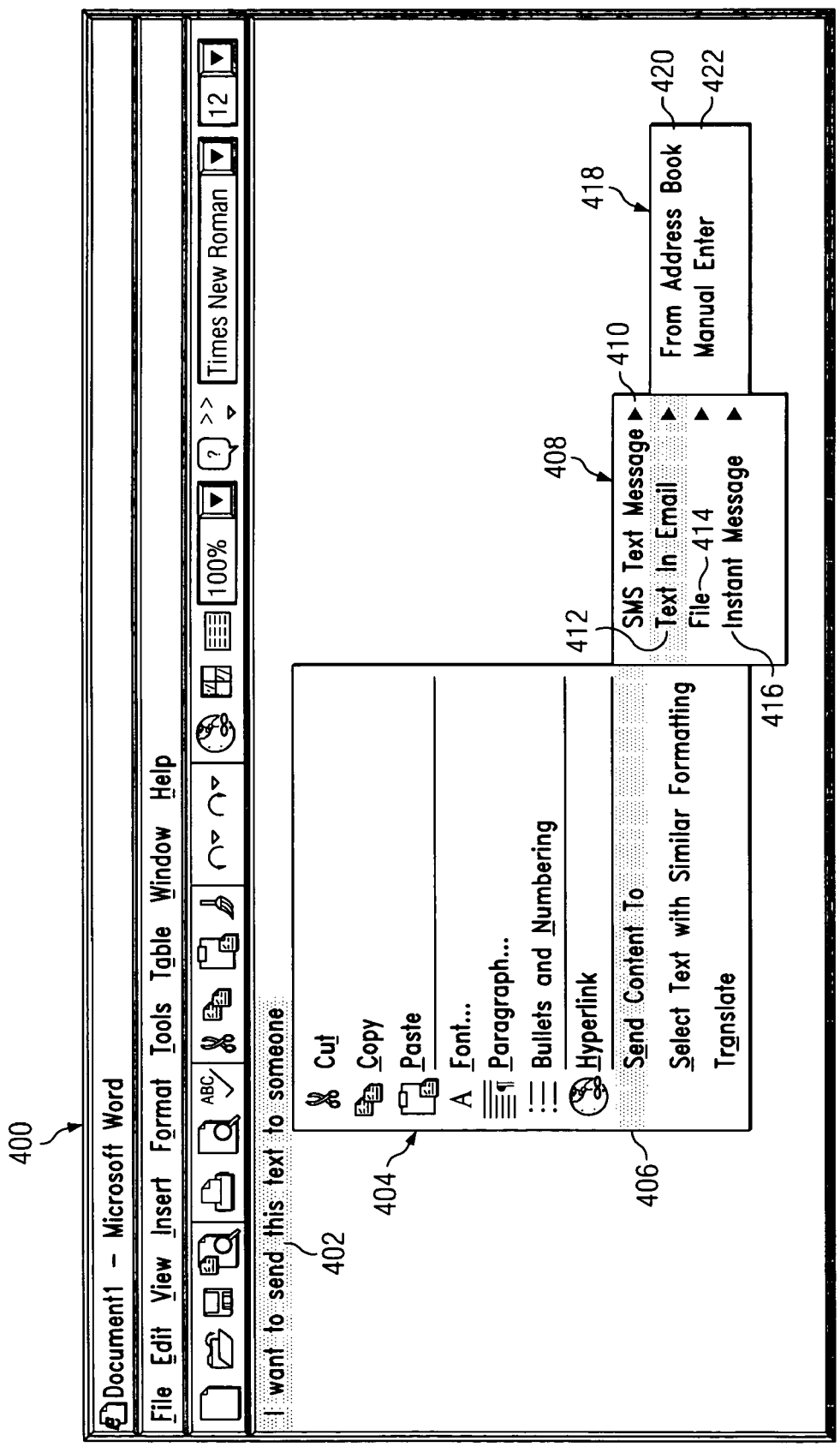
FIG. 4 is a diagram illustrating a user interface presented for transferring content in accordance with a preferred embodiment of the present invention.

Turning now to FIG. 4, a diagram illustrating a user interface presented for transferring content is depicted in accordance with a preferred embodiment of the present invention. In this example, window 400 is an example of a window in a word processor and may be presented by an application, such as application 300 in FIG. 3. In this example, text 402 is the content selected by the user for transfer.

When a selected user input, such as a right click on a mouse button, is entered, menu 404 is presented to the user. As can be seen, this menu provides for a transfer function as indicated by option 406. Option 406 allows a user to send content to another application or location. Selection of option 406 causes the presentation of sub-menu 408.

As can be seen in this example, sub-menu 408 defines different transfer functions that may be selected by the user. For example, option 410 is for an SMS text message, option 412 is for text in an email message, option 414 provides for sending the content to a file, and option 416 provides for sending the content in an instant message. In the case that the user selects option 414, the user is presented with options for saving the content to a file.

In this example, option 412 has been selected, which causes sub-menu 418 to be presented. Sub-menu 418 allows a user to select an address from an address book as indicated by option 420 or manually enter an email address using option 422. After the user has selected or has input an email address, the selected content is then automatically sent to the address using an email program without requiring the user to take any further steps.

Figure 5:
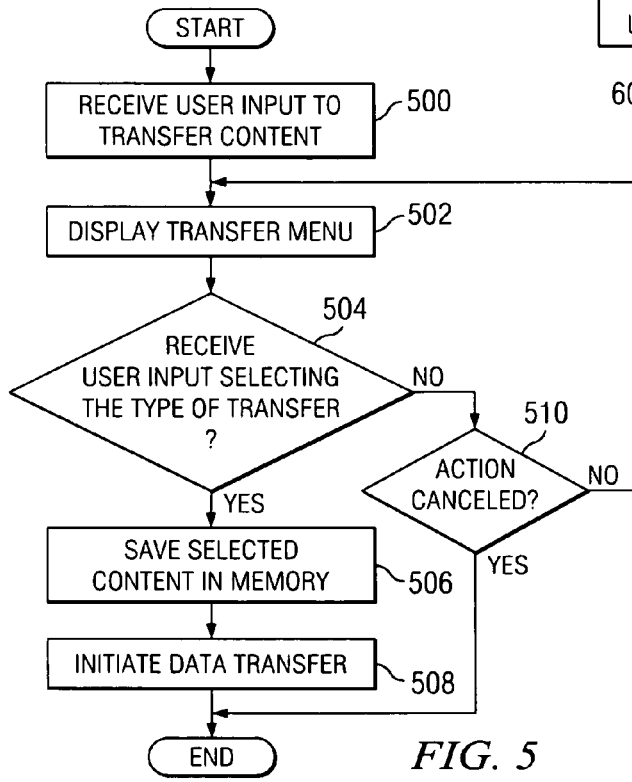
FIG. 5 is a flowchart of a process for transferring data in accordance with a preferred embodiment of the present invention.

Turning next to FIG. 5, a flowchart of a process for transferring data is depicted in accordance with a preferred embodiment of the present invention. The process illustrated in FIG. 5 may be implemented in a data transfer process, such as data transfer process 312 in FIG. 3.

The process begins by receiving a user input to transfer content (step 500). As described above, this user input may be, for example, a right click on a mouse button or some other pointing device. Thereafter, a transfer menu is displayed (step 502). This menu is similar to menu 404 in FIG. 4, in which option 406 provides for a transfer function.

Next, a determination is made as to whether the user input has been received selecting the type of transfer (step 504). This user input is for selecting a transfer type, such as those presented in sub-menu 408 in FIG. 4. If a user input, selecting the transfer type, has been received, the selected content is saved in the memory (step 506). In these examples, the memory is a clip board maintained by the operating system. Thereafter, the data transfer of the content is initiated (step 508) with the process terminating thereafter.

With reference again to step 504, if a user input, selecting the transfer, has not been received a determination is made as to whether the action has been canceled (step 510). If the action has not been canceled, the process returns to step 502. Otherwise, the process terminates.

Figure 6:
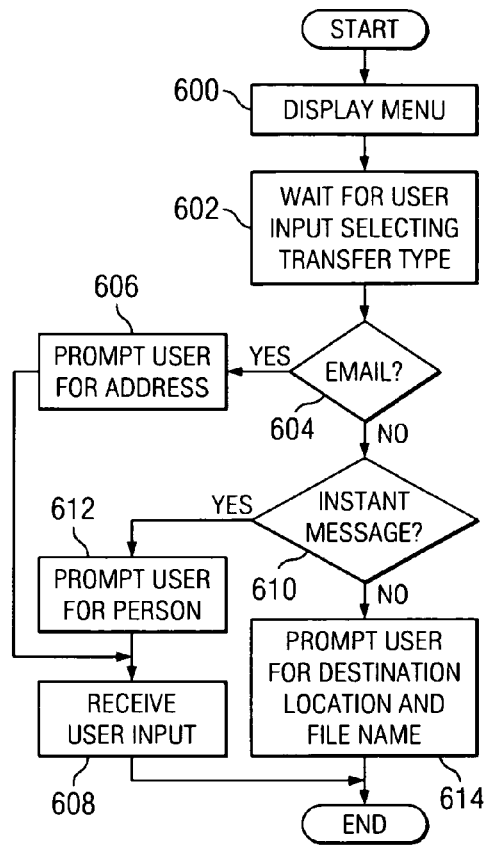
FIG. 6 is a flowchart of a process for presenting a user interface in accordance with a preferred embodiment of the present invention.

With reference next to FIG. 6, a flowchart of a process for presenting a user interface is depicted in accordance with a preferred embodiment of the present invention. This user interface is an example of a user interface that may be presented through a data transfer process, such as data transfer process 312 in FIG. 3.

The process begins by displaying a menu (step 600). In this example, the menu is displayed in response to a user input indicating that a transfer of content is desired. Thereafter, the process waits for a user input selecting the transfer type (step 602). A determination is made as to whether the user input is to send the content through email (step 604). If the user input is to use email, the user is prompted for an email address (step 606). This prompt may be for the user to select an email address from an address book, or to manually enter the email address. Thereafter, the user input is received (step 608) with the process terminating thereafter.

With reference again to step 604, if the input is not for a transfer using email, a determination is made as to whether the input is for transferring the content using an instant message (step 610). If the input is for transferring the content through an instant message, the user is prompted for a person or "buddy" (step 612) with the process then proceeding to step 608 as described above.

With reference again to step 610, if the user input does not select a transfer type as being an instant message, the user is prompted for a destination location and file name (step 614) with the process then terminating thereafter.

Thus, the present invention provides an improved method, apparatus, and computer instructions for transferring content. The mechanism of the present invention takes advantage of the currently available copy and paste functions as well as buffering storage facilities provided for copied content, such as a clip board. A data transfer process is provided to allow a user to easily and quickly transfer data to another application or location.

In the illustrative examples, the content may be transferred to another location via email, text message, or instant message, or directly to a separate file. Of course, other mechanisms may be used depending on the particular implementation. In this manner, the mechanism of the present invention manages a tedious process of stripping out or selecting content and placing that content into another process, such as another application or a file system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for sending content from a first application to a second application, the method comprising the computer implemented steps of:
    providing a plurality of different applications, wherein each of said applications is available for selection by a user as the second application that is to receive the content from the first application;
    responsive to detecting a single user input indicating selection of a particular application of said plurality to be the second application, copying the content to form copied content; and
    without further user input after said single user input, and after forming the copied content, initiating the particular selected application to be the second application, and sending the copied content to the second application.

2. The method of claim 1, wherein the copied content is sent to the second application using an application program interface.

3. The method of claim 1, wherein the first application and the second application are selected from one of a word processing program, an email program, an instant messaging program, or a spreadsheet program.

4. The method of claim 1, wherein the copying step comprises:
  copying, by a data transfer process in an operating system process, the selection of the content to form copied content in response to detecting the user input.

5. The method of claim 4, wherein the sending step comprises:
  initiating execution of the second application, by the data transfer process, if the second application is not currently executing;
  sending, by the data transfer process, the copied content to the second application.

6. The method of claim 5, wherein the second application is a communications program and wherein the sending step further comprises:
  initiating a transfer of the copied content, by the data transfer process, to a user selected destination.

7. The method of claim 1, wherein the copied content is stored in a clipboard handled by an operating system.

8. The method of claim 1 further comprising:
  responsive to a second user input indicating a selection of content for transfer to a file, copying the selection of content to form copied content; and
  saving the copied content to the file.

9. A method in a data processing system for sending content from a first application to a second application, the method comprising the computer implemented steps of:
  providing a plurality of different applications, wherein each of said applications is available for selection by a user as the second application that is to receive the content from the first application, and said plurality of applications includes at least an e-mail program for transferring the content over a specified network;
  responsive to detecting a single user input indicating selection of a particular application of said plurality to be the second application, copying the content to form copied content; and
  without further user input, initiating the particular selected application to be the second application, and sending the copied content to the second application.

10. The method of claim 9, wherein said plurality of applications includes a word processing program located in the data processing system.

* * * * *